United States Patent Office 3,125,549
Patented Mar. 17, 1964

3,125,549
HEAT STABILIZING VINYL RESINS
James A. Gallagher, Cranford, and Frank C. La Motta, Fords, N.J., and Walter L. Van Nostrand, Jr., Staten Island, N.Y., assignors to Esso Research and Engineering Company, a corporation of Delaware
No Drawing. Filed Dec. 14, 1961, Ser. No. 159,456
2 Claims. (Cl. 260—45.7)

This invention relates to the stabilizing of vinyl resins against thermal degradation at temperatures near or above the fusing point of the vinyl resins.

Polyvinyl chloride, polyvinyl acetate and copolymers of vinyl chloride and vinyl acetate are useful in forming films for coating various objects. The utility of such films has been limited, however, by the fact that the vinyl polymers and copolymers undergo thermal degradation at temperature above the fusion point, namely, about 350° F. This means that the films cannot be baked at temperatures above about 320° F. Films baked below about 320° F. will normally be heat stable for short periods of time. Films baked at these lower temperatures do not exhibit the hardness characteristics desired for many uses and which can be obtained by baking at higher temperatures.

It has now been found that the thermal instability of vinyl resin films at temperatures above 320° F. can be overcome by the addition of a small amount of the oxidized polymers of conjugated diolefins to solutions of the vinyl resin prior to laying down the film.

The conjugated diolefin polymers falling within the purview of this invention are polymerized acyclic conjugated diolefins of 4 to 6 carbon atoms and copolymers consisting of 25 to 100 parts by weight of said diolefin and 0 to 75 parts by weight of an ethylenically unsaturated monomer. Suitable diolefins include butadiene, isoprene, dimethyl butadiene, piperylene, and methyl pentadiene. The ethylenically unsaturated comonomers include styrene, acrylonitrile, methyl vinyl ketone, and ring-substituted styrenes such as paramethyl styrene, dimethyl styrene, etc. These polymers may be prepared by several known methods, i.e., (1) by emulsion polymerization as described in U.S. Patent No. 2,500,983 to Frolich; (2) by solution polymerization as described in U.S. Patent No. 2,586,594 to Gleason; (3) by peroxide polymerization as described in U.S. Patent No. 2,581,094 to Gleason et al.; or by solution polymerization with an alkali metal catalyst as described in U.S. Patent No. 2,762,851 to Gleason and U.S. Patent No. 2,849,510 to Jaros et al.

A particularly desirable polymer suitable for oxidation and use in accordance with the present invention is the product obtained by sodium copolymerization of butadiene and styrene as described in U.S. Patent No. 2,849,510. This product is a solution of polymer in a suitable hydrocarbon solvent such as solvent naphtha or mineral spirits. In appearance it is a clear, colorless to light yellow oily composition and has a viscosity of about 0.15 to 22 poises at 50% N.V.M. Further details concerning the preparation of these polymers may be had by consulting the patents mentioned above, the subject matter of which is incorporated herein by references.

The above polymers are then oxidized by blowing them with air or oxygen in the presence of hydrocarbon solvents having a kauri-butanol value of at least 40, such as aromatic hydrocarbons, with or without aliphatic hydrocarbons, boiling up to about 250° C., preferably between 100 and 200° C. The oxidation can be carried out by blowing air or oxygen or other oxygen-containing gas into the polymer, if desired, in the presence of 0.001 to 1.0% of a catalyst such as the naphthenates, octoates, and oleates of cobalt, lead, iron and manganese. The nature of the oxidized polymer depends largely upon the type of the original polymerization and the extent of the oxidation which in turn is dependent upon time, temperature, catalyst, solvent and the like. In general, the product will contain from a trace to about 20% oxygen. For the purposes of this invention the oxidized product should contain at least 10% oxygen.

In accordance with the present invention about 1 to 5 wt. percent of the above oxidized product containing 10 to 20 wt. percent oxygen is added to hydrocarbon solutions of vinyl resins to prevent thermal degradation of films made therefrom when baked at temperatures above 320° F.

The advantages of the invention will be better understood from a consideration of the following experimental data which are given for the sake of illustration, but without intention of limiting the invention thereto.

Example I

A polymer was prepared by continuously introducing into a large vessel divided by horizontal baffles into a five stage unit, a feed mixture having the following composition in weight percent on monomers:

| | |
|---|---|
| Butadiene | 80 |
| Styrene | 20 |
| Dioxane | 30 |
| Naphtha | 89 |
| Isopropylalcohol | 0.3 |
| Temperature, °C | 60–80 |

The catalyst was destroyed and removed and the product finished to substantially 100% N.V.M. The resulting product had a viscosity of 1.5 poises at 50% N.V.M. in Varsol solution. The polymer was then dissolved in Solvesso 150 (a substantially 100% aromatic hydrocarbon fraction boiling 365–415° F.) to make a 35% N.V.M. solution. It was then blown with air at about 230° F. until the oxygen content reached 11%. A second batch was blown until the oxygen content reached 16%.

Example II

Solution of a polyvinyl chloride resin in a mixed ketone/aromatic hydrocarbon solvent were prepared and 5% of each of the blown butadiene-styrene copolymers of Example I, containing 10 and 16 wt. percent oxygen respectively were added thereto. Wet films of each, with and without the air blown polymer added, were drawn down on steel panels and the panels baked 10 minutes at 350° F. The coatings containing the air blown diolefin polymer did not darken while the panels coated with the vinyl resin alone were black. Similar panels coated with a vinyl resin not containing the air blown polymer and baked for 10 minutes at 300° F. likewise did not darken.

The above data illustrate the effectiveness of small amounts of air blown diolefin polymers in preventing high temperature thermal degradation. This stabilizing effect is also applicable to molding compounds, organosols, plastisols, sheeting, etc.

The nature of the present invention having been thus fully set forth and specific examples of the same given, what is claimed as new and useful and desired to be secured by Letters Patent is:

1. A composition of matter comprising polyvinyl chloride resin and as a heat stabilizing agent therefor 1 to 5 parts by weight per 100 parts of resin of an oxidized polymer of 25 to 100 parts by weight of a conjugated diolefin of 4 to 6 carbon atoms and 0 to 75 parts by weight of an ethylenically unsaturated monomer, containing 10 to 20% oxygen, said composition being stable to heating for at least 10 minutes to a temperature of at least 350° F.

2. The composition of claim 1 in which the copolymer is a copolymer of 80 parts by weight of butadiene and 20 parts by weight of styrene.

No references cited.